UNITED STATES PATENT OFFICE.

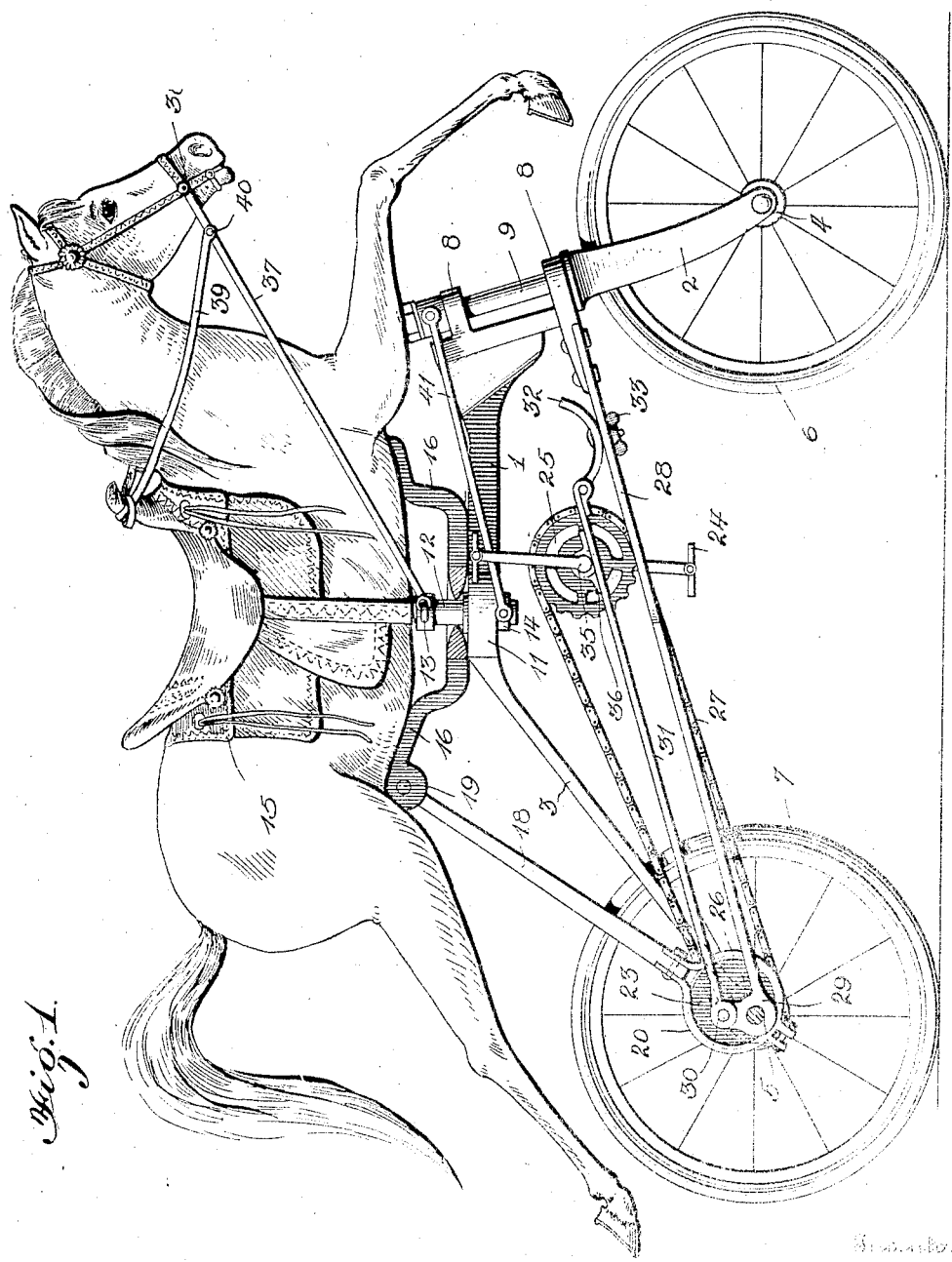

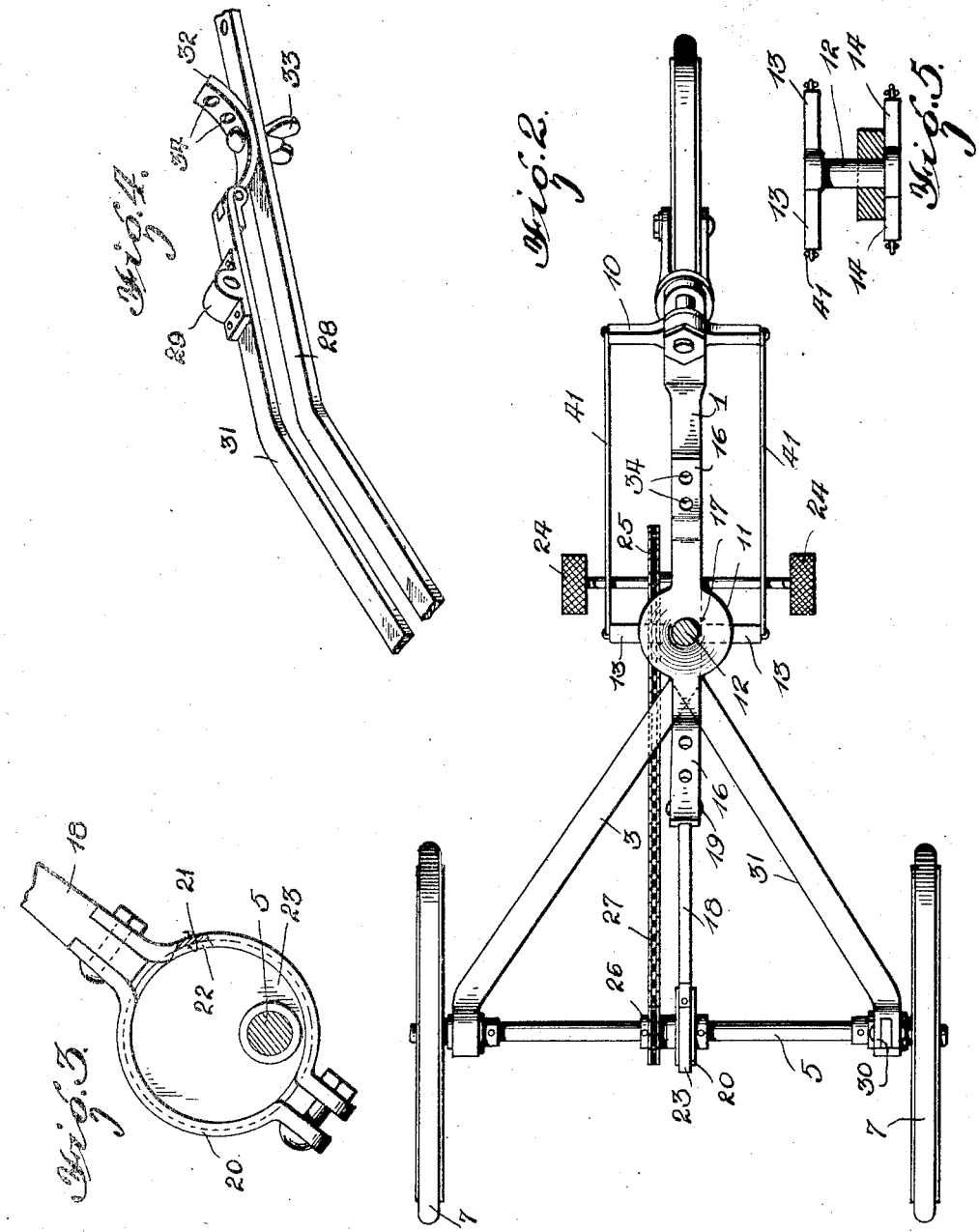

MARTIN B. ZIMMERMAN, OF UNIONVILLE, CONNECTICUT.

CHILD'S VEHICLE.

1,381,954.   Specification of Letters Patent.   Patented June 21, 1921.

Application filed August 11, 1920. Serial No. 402,744.

*To all whom it may concern:*

Be it known that I, MARTIN B. ZIMMERMAN, citizen of the United States of America, residing at Unionville, in the county of Hartford and State of Connecticut, have invented certain new and useful Improvements in Children's Vehicles, of which the following is a specification.

The object of my invention is to provide a self-propelled child's vehicle in which the riding member of the structure simulates the loping movement of a horse when the vehicle is being propelled.

A further object is to provide means for adjusting the height of the propelling mechanism with reference to the riding member whereby children of different heights may conveniently operate the same.

Other and further objects and advantages will be in part described and in part obvious as the description is proceeded with.

In the accompanying drawings:

Figure 1 is a side view of my invention;

Fig. 2 is a top plan view of Fig. 1 with the riding member or horse removed;

Fig. 3 is a detail view of the rocker arm;

Fig. 4 is a detail view of the sprocket wheel adjusting means; and

Fig. 5 is a detail view of the steering shaft.

Referring more particularly to the drawings wherein like reference numerals refer to corresponding parts throughout the several views 1 denotes a horizontally disposed frame having front and rear forks 2 and 3 supported upon front and rear axles 4 and 5 in turn supported respectively by the single front wheel 6 and the rear wheels 7. Fixed to the front fork 2 and extending up through bearings 8 on the frame 1 is a steering column 9 formed on its upper end with a cross bar 10.

The frame 1 is formed with a substantial enlargement 11 at its point of intersection with or attachment to the rear fork 3 in which enlargement is rotatably mounted a stud 12 having arms 13 and 14 extending from the upper and lower ends thereof respectively. The riding member 15, which in the present instance represents a horse is mounted upon the stud 12 with freedom of forward and backward rocking movement by means of a bracket 16, centrally apertured as at 17 to loosely receive said stud. This rocking movement is effected by means of a rod 18 pivoted as at 19 at its upper end to the bracket 16 and at its lower end fixedly connected to a ring 20. This ring is formed with an internal approximately V-shaped circumferential groove 21 adapted to loosely receive the wedge shaped peripheral edge 22 of a cam 23 in turn fixedly mounted upon the rear axle 5. It will thus be seen that when the vehicle is propelled over the ground by means of pedals 24, front and rear sprockets 25 and 26 respectively and sprocket chain 27, rotation of the cam 23 within the ring 20 causes an oscillatory or rocking movement to be imparted to the horse 15 through the bar 18.

The sprocket wheel supporting and elevating mechanism comprises a bar 28 at its forward end connected to and supported by the front forks 2, and at its other end formed with an apertured enlargement 29 in turn supported upon the rear axle 5, said axle of course turning therein. This enlargement is formed with an upstanding ear 30 to which is pivoted the rear extremity of an adjustable bar 31, overlying the bar 28. Pivoted to the forward end of the bar 31 is an arcuate link member 32 adapted to be secured in adjusted position to the bar 28 by means of a thumb screw 33 carried by said bar and passing through apertures 34 formed in said link member. It will be noted that the axle 35 of the front sprocket wheel 25 is supported in a bearing 36 fixed to the top face of the adjustable bar 31, and in consequence that any upward or downward adjustment of the bar 31, effected by changing the thumb screw from one to another of the apertures 34, will result in a corresponding movement of the sprocket wheel 25.

Steering of the vehicle is effected by means of a steering cord 37 passing freely through the mouth of the horse 15 as at 38 and connected at its opposite ends to the arms 13 of the stud. Rein 39 is connected at its ends to rings 40 fixed to the steering cord adjacent each side of the horse's head. It will thus be seen that a pull with either hand on the rein 37 will cause the stud 12 to be rotated either in a clockwise or anti-clockwise direction, such movement being communicated to the steering wheel 9 in an obvious manner by virtue of the connection of the stud 12 with the cross bar 10 of the steering column 9 and the arm 14 on the lower end of the stud 12, by means of connecting bars 41.

Having thus described my invention:

What I claim is:

1. A child's vehicle comprising a frame, front and rear wheels supporting said frame, a rotatable stud mounted in said frame, said stud having arms on its upper and lower ends, a riding member mounted for rocking movement on said stud, a steering column for said front wheel having a cross bar connected to said lower arms, a steering cord passing loosely through the head of said riding member, and a rein member connected to said steering cord for actuating the same.

2. A child's vehicle comprising a frame, front and rear wheels and axles therefor supporting said frame, a riding member on said frame, a sprocket and chain and foot pedal drive for said rear wheels, means for adjusting the drive sprocket and pedals therefor toward or away from said driving member comprising a supporting bar for the drive sprocket axle loosely connected to the rear axle, a second bar pivoted at one end to said first mentioned bar and having its free end adjustably secured to said first mentioned bar whereby said sprocket and axle may be adjusted with respect to said riding member.

3. A child's vehicle comprising a frame, front and rear wheels and axles therefor supporting said frame, a stud on said frame, a bracket loosely seated on said stud, a rocking riding member supported on said bracket, means for rocking said riding member comprising a cam on said rear axle, a ring loosely receiving said cam, a rod connecting said riding member with said ring, and means for rotating said axle.

In testimony whereof I affix my signature.

MARTIN B. ZIMMERMAN.